July 12, 1949.  F. E. FITZSIMONS  2,475,884
BAIT HOLDING TREADLE FOR MOUSETRAPS
Filed June 21, 1948
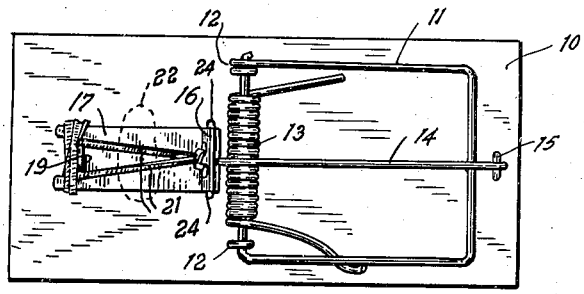
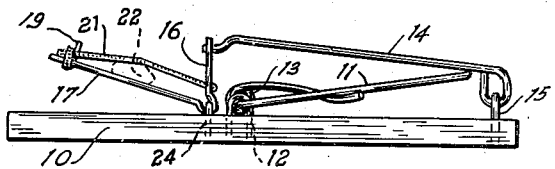
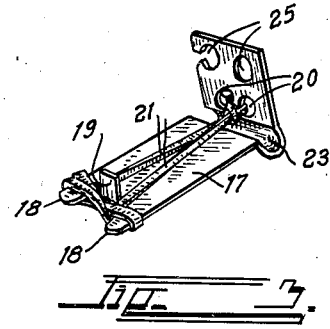
INVENTOR.
FRANK E. FITZSIMONS.
BY
ATTORNEY.

Patented July 12, 1949

2,475,884

UNITED STATES PATENT OFFICE 2,475,884

BAIT HOLDING TREADLE FOR MOUSETRAPS

Frank E. Fitzsimons, St. Louis, Mo.

Application June 21, 1948, Serial No. 34,243

2 Claims. (Cl. 43—81)

This invention relates to an improved bait holding treadle for mouse traps. The usual mouse trap is provided with a prong or hook which is designed to retain the bait in place. It is exceedingly difficult to place certain kinds of bait such as hard cheese, etc., on such a treadle.

The principal object of this invention is to provide a treadle upon which any kind of bait can be quickly and easily placed and which will securely retain the bait in place regardless of movements or positions of the trap.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of a conventional mouse trap illustrating the improved bait holding treadle in place thereon;

Fig. 2 is a side view of the trap of Fig. 1; and

Fig. 3 is a detail perspective view of the treadle portion of the trap.

The treadle could be applied to any of the conventional type of snap mouse traps one of which is illustrated in Fig. 1, consisting of a baseboard 10 to which a rectangular wire frame 11 is hingedly attached by means of staples 12. A coiled wire spring 13 surrounds the hinge portion of the frame and serves to flip the latter from one extremity of the baseboard 11 to the other extremity thereof.

The frame is retained in the set position by means of a releasing bar 14 mounted on a staple 15 at one extremity of the base 10. The other extremity of the bar 14 is hooked into a vertical arm 16 of a trigger treadle 17. The vertical arm 16 extends upwardly from the treadle 17, the juncture of the two being passed about an elongated hinge staple 24.

The usual treadle contains one or more bar holes 25 for receiving the extremity of the bar 14. The improved treadle contains two additional holes 20 through which one extremity of an endless rubber band 21 is tied. The other extremity of the treadle 17 terminates in two horizontal prongs 18 positioned on each side of a vertical prong 19. All of the prongs 18 and 19 are cut from the material of the extremity of the treadle 17.

The rubber band 21 is passed on each side of the vertical prong 19 and wrapped about the prongs 18 as shown in Fig. 3.

Any suitable bait such as indicated at 22 may be placed on the treadle 17 beneath the band 21 where it will be held in place by the inherent elasticity of the band.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A treadle for spring type snap mouse traps comprising: a horizontal treadle portion looped near one extremity to form a hinge loop; a vertical arm portion extending from said hinge loop and provided with openings; prongs formed on the opposite extremity of said treadle portion; and a rubber band passing through said openings and secured about said prongs so as to lie against the upper surface of said treadle to retain bait thereon.

2. A treadle for spring type snap mouse traps comprising: a horizontal treadle portion looped near one extremity to form a hinge loop; a vertical arm portion extending from said hinge loop and provided with openings; prongs formed on the opposite extremity of said treadle portion; and a rubber band passing through said openings and secured about said prongs so as to lie against the upper surface of said treadle to retain bait thereon; said opening comprising two openings formed in the vertical arm portion adjacent the hinge loop thereof; and said rubber band comprising an endless band secured through said two openings at its one extremity and wrapped about said prongs at its other extremity.

FRANK E. FITZSIMONS.

REFERENCES CITED

The following references are of record in the file of this patent:

UNITED STATES PATENTS

| Number | Name | Date |
| --- | --- | --- |
| 942,528 | Wilbur | Dec. 7, 1909 |
| 1,781,163 | Clarkson | Nov. 11, 1930 |
| 1,987,831 | Kleffman | Jan. 15, 1935 |
| 2,173,027 | Speer | Sept. 12, 1939 |